United States Patent
Sudo et al.

(10) Patent No.: US 10,652,211 B2
(45) Date of Patent: May 12, 2020

(54) CONTROL DEVICE, BORDER ROUTER, CONTROL METHOD, AND CONTROL PROGRAM

(71) Applicant: NIPPON TELEGRAPH AND TELEPHONE CORPORATION, Chiyoda-ku (JP)

(72) Inventors: Yuichi Sudo, Musashino (JP); Takahiro Hamada, Musashino (JP); Masami Ueno, Musashino (JP); Yuminobu Igarashi, Musashino (JP); Hideo Kitazume, Musashino (JP); Bo Hu, Musashino (JP); Yuichi Murata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 320 days.

(21) Appl. No.: 15/524,659

(22) PCT Filed: Nov. 18, 2015

(86) PCT No.: PCT/JP2015/082421
§ 371 (c)(1),
(2) Date: May 5, 2017

(87) PCT Pub. No.: WO2016/080446
PCT Pub. Date: May 26, 2016

(65) Prior Publication Data
US 2018/0041471 A1 Feb. 8, 2018

(30) Foreign Application Priority Data
Nov. 19, 2014 (JP) .................. 2014-234762

(51) Int. Cl.
*H04L 29/06* (2006.01)
*H04L 12/66* (2006.01)
*H04L 12/823* (2013.01)

(52) U.S. Cl.
CPC .......... *H04L 63/0236* (2013.01); *H04L 12/66* (2013.01); *H04L 63/1416* (2013.01); *H04L 47/32* (2013.01); *H04L 63/101* (2013.01)

(58) Field of Classification Search
CPC ....... H04L 12/66; H04L 63/0209–0218; H04L 63/0227–0263; H04L 63/1408–1425; H04L 63/1441; H04L 63/1458
See application file for complete search history.

(56) References Cited

U.S. PATENT DOCUMENTS

| 2007/0153763 | A1* | 7/2007 | Rampolla | H04L 41/0806 370/351 |
| 2008/0028467 | A1* | 1/2008 | Kommareddy | H04L 63/1458 726/23 |

(Continued)

FOREIGN PATENT DOCUMENTS

| CN | 1874303 A | 12/2006 |
| CN | 101188612 A | 5/2008 |
| JP | 2005-193590 A | 7/2005 |

OTHER PUBLICATIONS

Extended European Search Report dated May 22, 2018 in Patent Application No. 15861601.1, 6 pages.

(Continued)

*Primary Examiner* — Kevin Bechtel
(74) *Attorney, Agent, or Firm* — Oblon, McClelland, Maier & Neustadt, L.L.P.

(57) ABSTRACT

When an attack is detected, a controller samples an attack-target addressed DNS reply, received by a border router, from each of the border routers. Then, the controller adds the transmission-source IP address of the sampled DNS reply to (Continued)

the black list of the border router. Furthermore, upon reception of any of a target-addressed DNS reply and a target-addressed UDP subsequent fragment from the IP address that is described in the black list, the controller gives a command to the border router to discard the packet. Furthermore, the controller specifies the setting, for each of the border routers, that DNS replies to a DNS request from the target are excluded from discarding.

11 Claims, 12 Drawing Sheets

(56) References Cited

U.S. PATENT DOCUMENTS

| | | | |
|---|---|---|---|
| 2012/0005743 A1 | 1/2012 | Kitazawa et al. | |
| 2014/0331308 A1* | 11/2014 | Smith | H04L 63/1441 726/12 |
| 2015/0150123 A1* | 5/2015 | Be'ery | H04L 63/1416 726/22 |

OTHER PUBLICATIONS

Mingwei Xu, et. al., "Source Address Filtering for Large Scale Networks" Computer Communications, Elsevier, vol. 37, XP028776532, Sep. 9, 2013, pp. 64-76.

International Search Report dated Feb. 2, 2016, in PCT/JP2015/082421, filed Nov. 18, 2015.

Shimokawa et al., "A proposal for the attacker blocking system using the OpenFlow and its evaluation", Symposium on Multimedia, Distributed, Cooperative and Mobile Systems (DICOMO2014) Ronbunshu, IPSJ Symposium Series, vol. 2014, No. 1, Jul. 9, 2014, 35 pages, with English translation.

Sudo et al., "Blocking off Reflective DoS attacks by Dynamic Packet Filter", IEICE Technical report IN2013-181, vol. 113, No. 473, Feb. 27, 2014, 21 pages, with English translation.

Office Action dated Oct. 31, 2019 in Chinese Application No. 201580062600.3 (w/computer-generated English translation).

Mingwei Xu, et al., "Source address filtering for large scale networks", Computer Communications 37 (2014) 64-76.

* cited by examiner

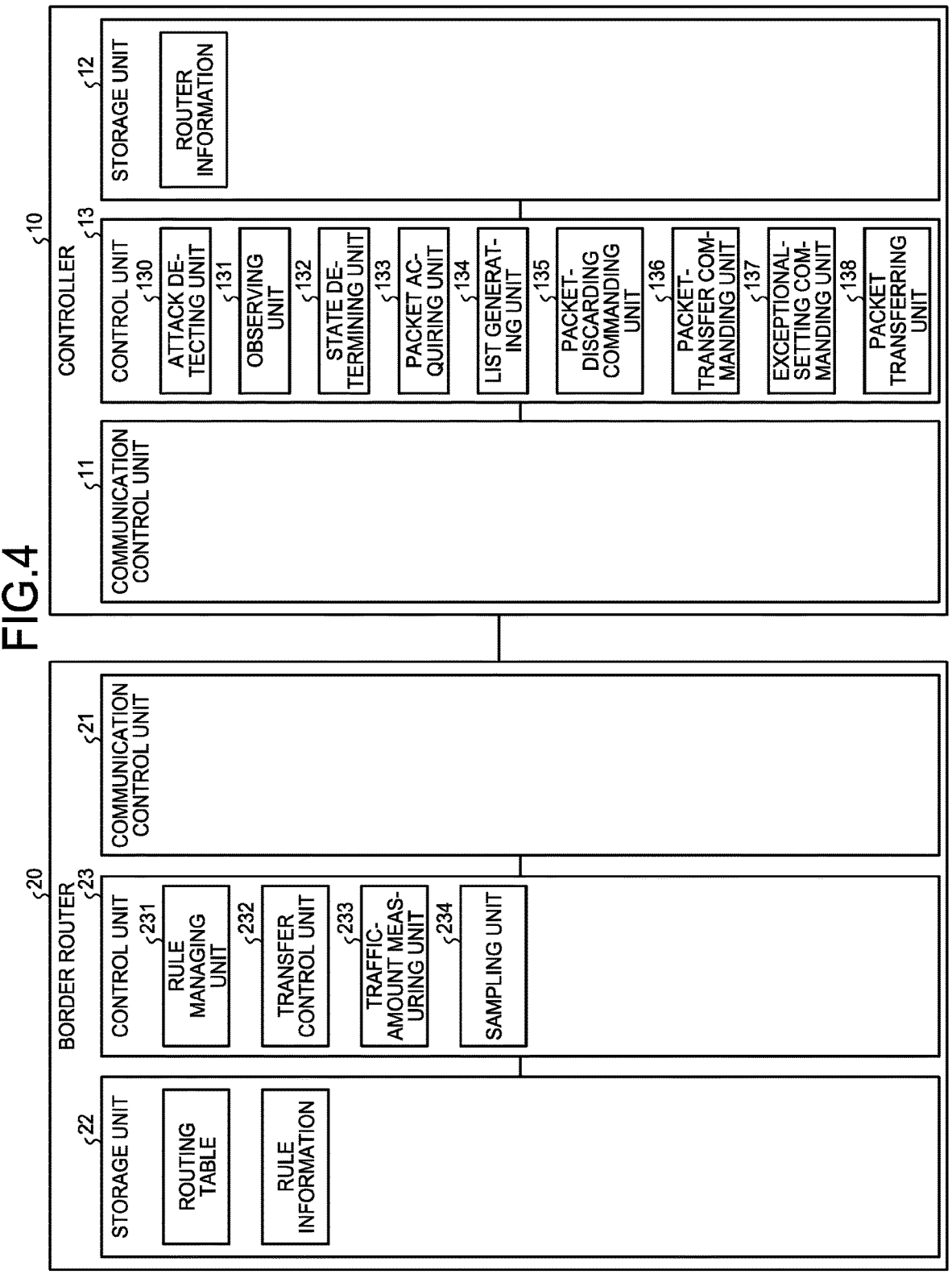

FIG.5

ROUTER INFORMATION

| ROUTER BORDER | STATE |
|---|---|
| 20A | INITIAL STATE |
| 20B | LIST PREPARATION STATE |
| ... | ... |

FIG.6

INITIAL STATE (1) TARGET-ADDRESSED DNS REPLIES AND UDP SUBSEQUENT FRAGMENTS ARE BLOCKED IN PRINCIPLE
(2) DNS REPLIES TO DNS REQUESTS, TRANSFERRED FROM CONTROLLER, ARE PASSED

LIST PREPARATION STATE (1) TARGET-ADDRESSED DNS REPLIES AND UDP SUBSEQUENT FRAGMENTS ARE BLOCKED IN PRINCIPLE
(2) DNS REPLIES TO DNS REQUESTS, TRANSFERRED FROM CONTROLLER, ARE PASSED
(3) TARGET-ADDRESSED DNS REPLY PACKET (TARGET-ADDRESSED BLACK-LIST EXCLUDED REPLY PACKET) WITH IP ADDRESS THAT IS NOT DESCRIBED IN BLACK LIST AS TRANSMISSION SOURCE IS SAMPLED AND IS TRANSMITTED TO CONTROLLER

LIST BLOCKING STATE (1) TARGET-ADDRESSED DNS REPLIES AND TARGET-ADDRESSED UDP SUBSEQUENT FRAGMENTS WITH IP ADDRESS DESCRIBED IN BLACK LIST AS TRANSMISSION SOURCE ARE BLOCKED IN PRINCIPLE
(2) DNS REPLIES TO DNS REQUESTS, TRANSFERRED FROM CONTROLLER, ARE PASSED
(3) TARGET-ADDRESSED DNS REPLY PACKET (TARGET-ADDRESSED BLACK-LIST EXCLUDED REPLY PACKET) WITH IP ADDRESS THAT IS NOT DESCRIBED IN BLACK LIST AS TRANSMISSION SOURCE IS SAMPLED AND IS TRANSMITTED TO CONTROLLER

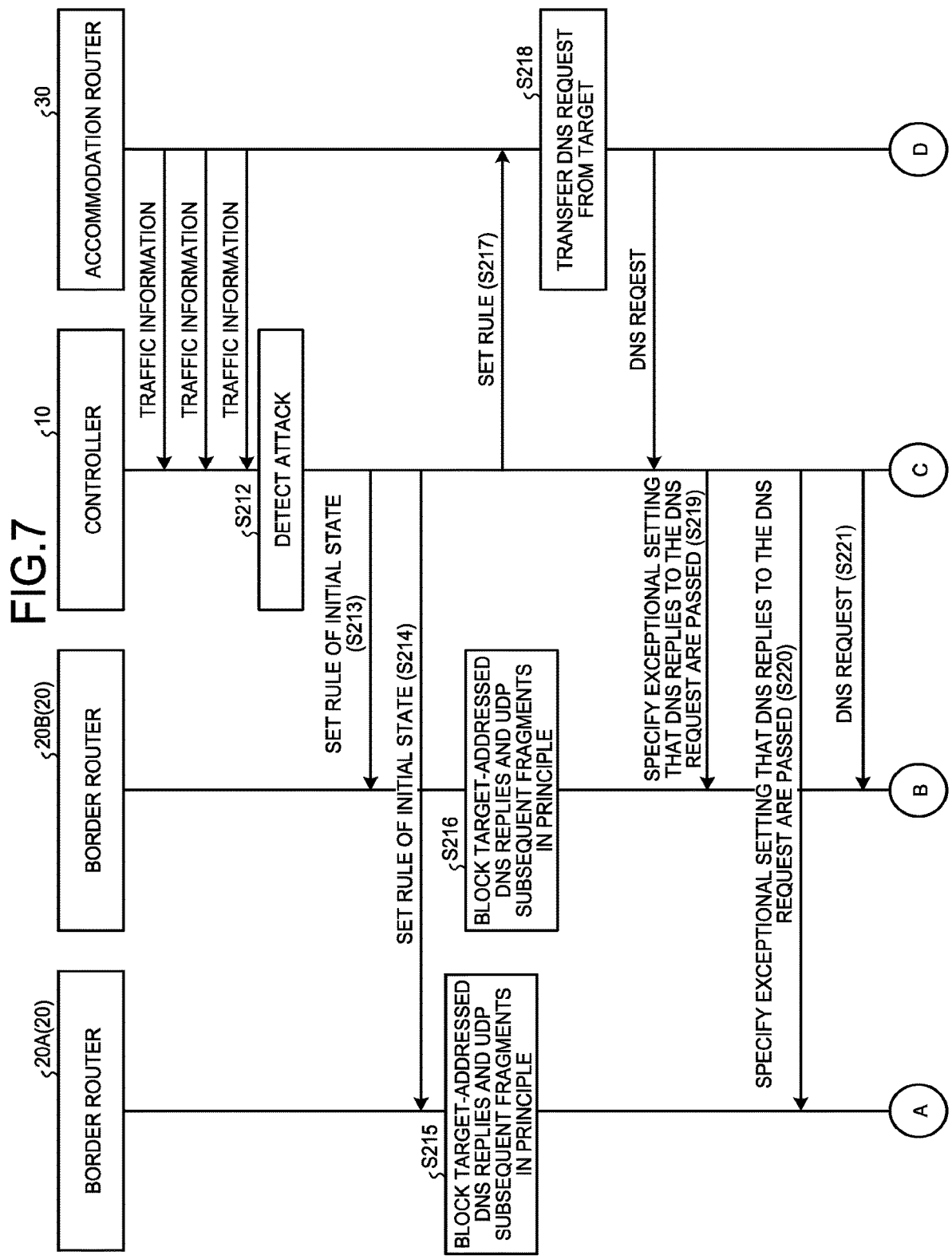

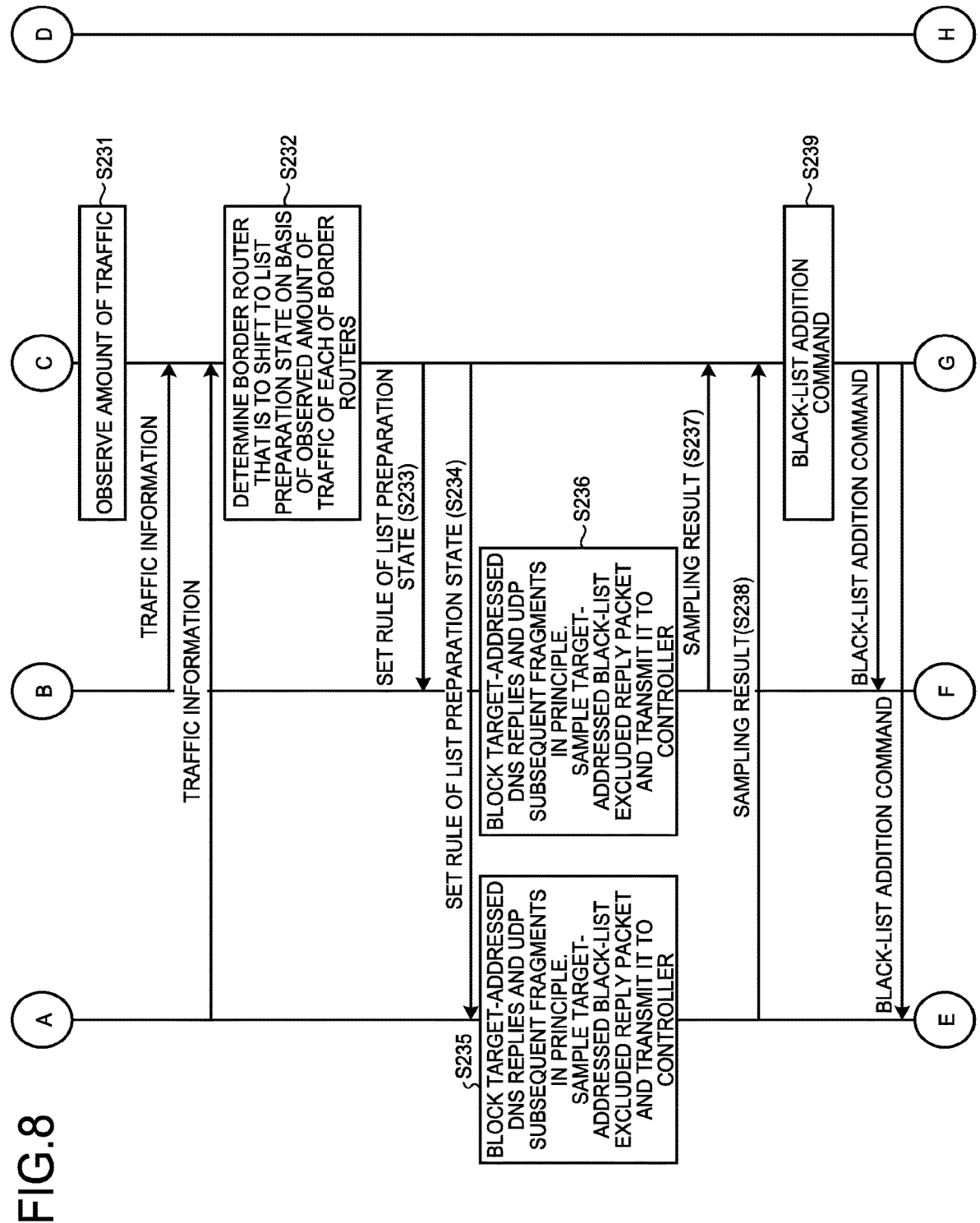

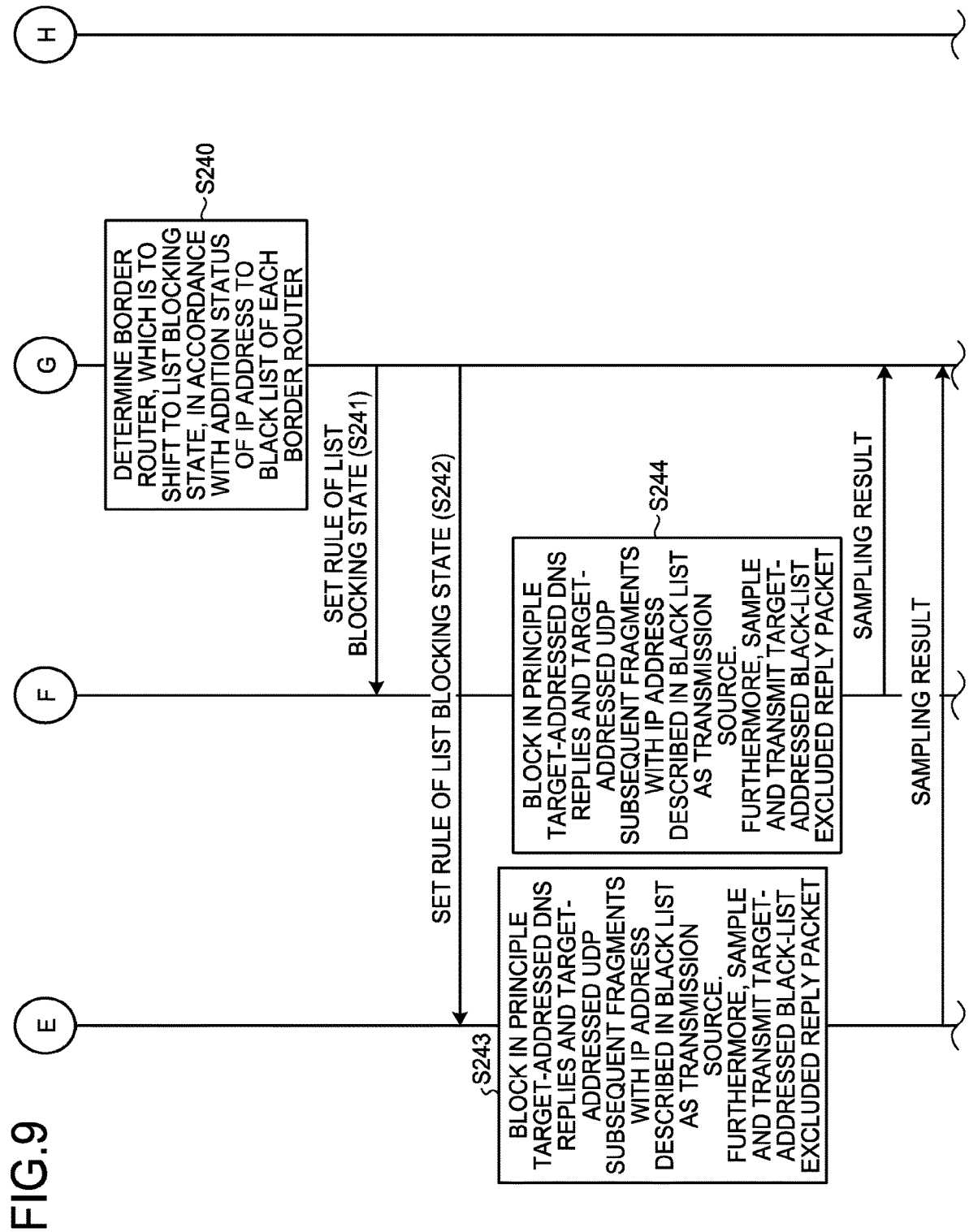

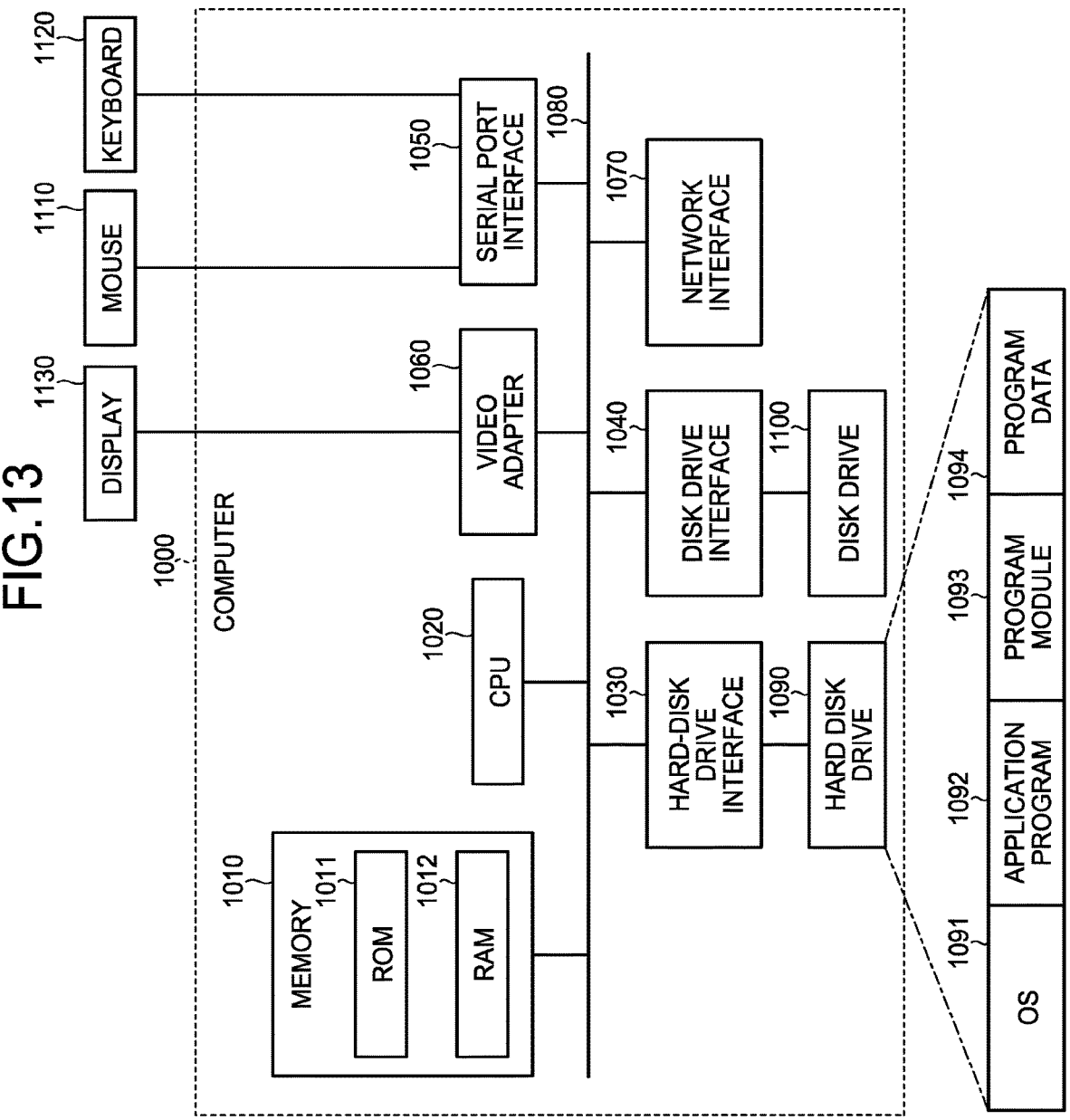

CONTROL DEVICE, BORDER ROUTER, CONTROL METHOD, AND CONTROL PROGRAM

FIELD

The present invention relates to a control device, a border router, a control method, and a control program.

BACKGROUND

Currently, there is a problem of reflective DDoS attack (Distributed Denial of Service attack) that uses reply packets of the UDP (User Datagram Protocol) for the DNS (Domain Name System), the NTP (Network Time Protocol), or the like. For example, if the attacker transmits DNS request packets with a fake transmission-source IP address to a large number of open resolvers that are spread in the network, each of the open resolvers resolves the name and transmits a reply packet to the fake transmission-source IP address. As a result, a large number of reply packets are centered on the fake transmission source (i.e., the target). Thus, the attacker applies loads of some hundreds of Gbps to the target network.

Here, as the protocol used for the DNS or the NTP is the UDP, it is difficult to block the above-described attacks by using the stateful inspection function of firewall. Therefore, there is a disclosed technology in which, when a request packet (i.e., allowable request packet) of the DNS or the NTP is received from the target side, a border router in the network adds the IP address and the port number of the transmission source of the request packet to the white list, and the border router transfers a reply packet (allowable reply packet), whose destination is the IP address and the port number described in the white list, but blocks (discards) other reply packets of the DNS or the NTP. According to this technology, it is possible to block attack packets and also reach allowable reply packets to the target.

CITATION LIST

Non Patent Literature

Non Patent Literature 1: Yuichi Sudo, et al., Blocking off Reflective DoS Attacks by Dynamic Packet Filter, IEICE technical report, vol. 113, no. 473, IN2013-181, pp. 223-228, March, 2014

SUMMARY

Technical Problem

Here, attack packets of the reflective DDoS attack tend to have a large size, and they are often transferred in fragments. For example, if the above-described DNS or NTP reply packets are fragmented, packets other than the first do not contain UDP header information. Therefore, with regard to the second and subsequent packets (UDP subsequent fragments) among the fragmented attack packets, it is difficult for the border router to determine whether the packet is a DNS or NTP packet. As a result, there is a possibility that fragmented attack packets cannot be blocked and they reach the target.

Therefore, the present invention has an object to solve the above-described problem so as to block fragmented attack packets and also reach allowable packets.

Solution to Problem

To solve the above-described problems, the present invention is a control device that gives a command to each of border routers, connecting networks, so as to control transfer of a packet, comprising: upon detection of an attack due to concentration of reply packets of a predetermined service, a packet acquiring unit that acquires at least some of reply packets of a predetermined service, addressed to a target of the attack and received by the border routers; a list generating unit that adds a transmission-source IP address of the acquired reply packet to a black list of the border router; and a packet-discarding commanding unit that, upon reception of a packet, addressed to the target of the attack, with an IP address described in the black list as a transmission source, gives a command to the border router so as to discard the packet.

Advantageous Effects of Invention

According to the present invention, it is possible to block fragmented attack packets and to reach allowable packets.

BRIEF DESCRIPTION OF DRAWINGS

FIG. 4 is a functional block diagram of a controller and a border router.

FIG. 5 is a diagram that illustrates an example of router information.

FIG. 6 is a diagram that illustrates an example of the rule in the initial state, the list preparation state, and the list blocking state.

FIG. 7 is a sequence diagram that illustrates an example of the steps of the process of the communication system in the initial state.

FIG. 8 is a sequence diagram that illustrates an example of the steps of the process of the communication system in the initial state→the list preparation state.

FIG. 9 is a sequence diagram that illustrates an example of the steps of the process of the communication system in the list preparation state→the list blocking state.

FIG. 13 is a diagram that illustrates a computer that executes a control program.

DESCRIPTION OF EMBODIMENTS

With reference to the drawings, an explanation is given below of the configuration (embodiment) for implementing the present invention. Furthermore, the present invention is not limited to the present embodiment. In the present embodiment, an explanation is given of the block system for reflective DDoS attacks using the DNS; however, the present invention is not limited to it, and blocking is possible during the same process for reflective DDoS attacks using the NTP or other protocols.

Figure 1:
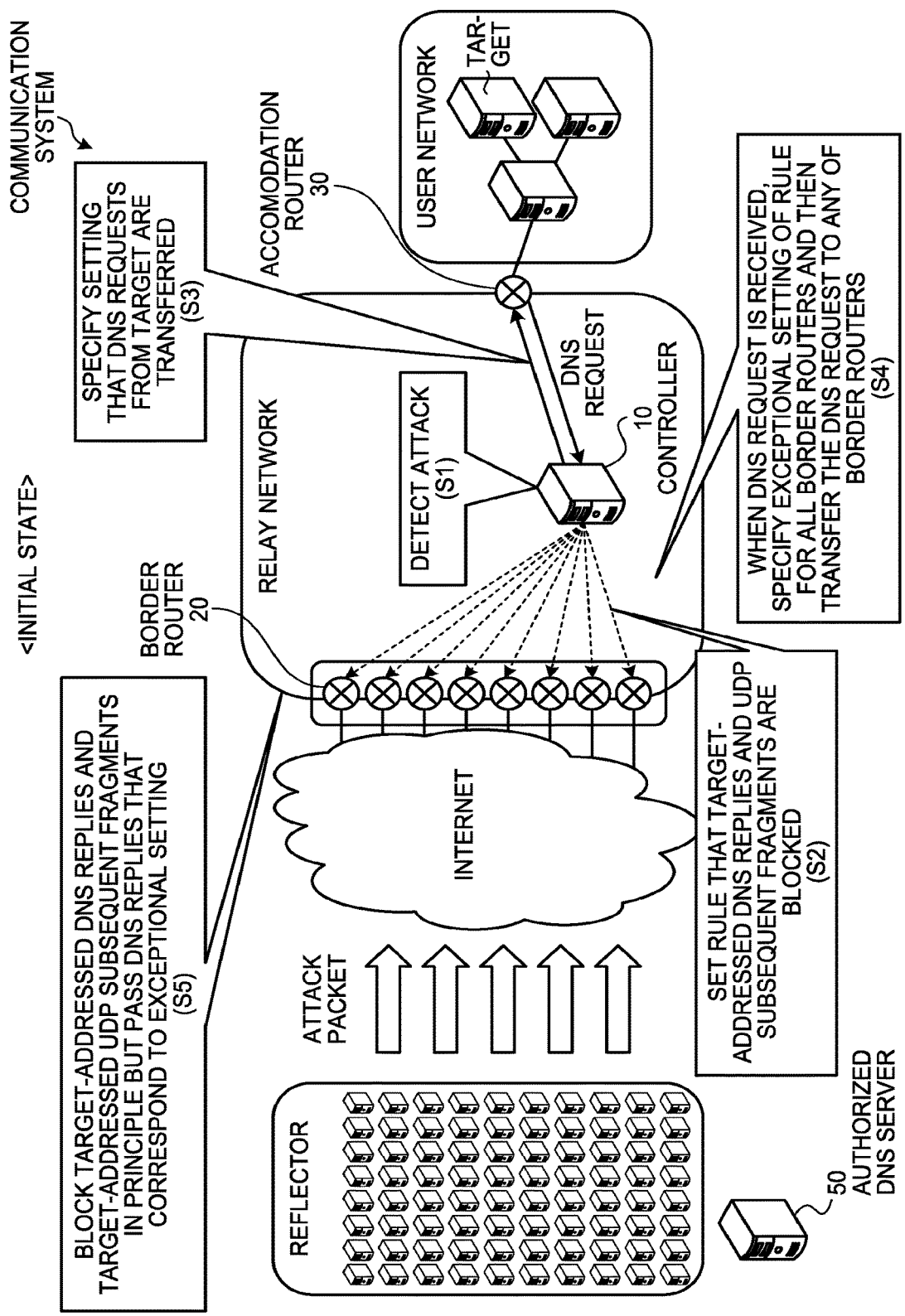
FIG. 1 is a diagram that illustrates the schematic operation of a communication system in the initial state.

First, an explanation is given of the configuration and the outline of the communication system according to the present embodiment. The communication system according to the present embodiment includes for example the Internet and the user network, as illustrated in FIG. 1. Communications between the Internet and the user network are relayed by a relay network.

For example, reflectors are connected to the Internet. The reflectors are, for example, open resolvers. The reflectors are the group of servers that are used as what are called steppingstones during attacks. Here, an explanation is given of a case where, for example, the reflectors receive request packets (DNS request packets) with a fake transmission source from the attacker and, as replies to the DNS request packets, transmits a large number of reply packets (attack packets) to the target (the IP address of the target or the IP address range including the IP address) within the user network via the Internet and the relay network. Here, the reply packets also include fragmented packets.

A border router 20 is provided between the Internet and the relay network to perform a process to transfer input packets. The border router 20 has functions to change internal transfer rules in accordance with commands from a controller 10, described later, to transfer packets, which match a specific condition, to the controller 10, or to transmit the traffic information to the controller 10. There is a communication specification called OpenFlow, for example, as the system for multiple routers to dynamically change route control settings in accordance with commands from the controller as described above. For instance, if the border router 20 is a router that is compatible with OpenFlow 1.0, the above-described functions may be implemented. Furthermore, as the router that is compatible with OpenFlow, there is Open vSwitch, or the like, that is published as open source software. An accommodation router 30 is provided between the relay network and the user network to control transfer of input packets. The accommodation router 30 has the same functionality as that of the border router 20. The controller (control device) 10 controls each of the border routers 20 and the accommodation router 30.

Here, if a large number of attack packets, which are addressed to the target, are transmitted from the reflectors, packets (e.g., DNS reply packets) are centered on the accommodation router 30 of the user network to which the target belongs. If the controller 10 detects concentration of the packets in the accommodation router 30, each of the border routers 20 first prepares for the black list that is used to block the attack packets (list preparation state). Then, after the black list is largely completed, the controller 10 causes each of the border routers 20 to block the attack packet by using the black list (list blocking state).

(The Initial State)

By using FIG. 1, an explanation is continuously given of the state (the initial state) before each of the border routers 20 enters the list preparation state. For example, if an attack to the target is detected due to concentration of DNS reply packets (DNS replies) to the accommodation router 30 (S1), the controller 10 determines that each of the border routers 20 shifts to the initial state. Then, the controller 10 sets the rule of the initial state for each of the border routers 20. Specifically, for each of the border routers 20, the rule that target-addressed DNS replies and UDP subsequent fragments are blocked (discarded) is established (S2).

Furthermore, the controller 10 specifies the setting for the accommodation router 30 that DNS requests (DNS request packets) from the target are transferred to the controller 10 (S3).

After S3, when a DNS request is received from the target via the accommodation router 30, the controller 10 specifies an exceptional setting of the rule (the setting that DNS replies to DNS requests from the target are passed. Specifically, the setting that a DNS reply packet, whose transmission source is the destination IP address of the corresponding request, is passed) for all the border routers 20 and then transfers the DNS request to any of the border routers 20 (S4).

In this way, if the rule of the initial state and the exceptional setting are received from the controller 10, the border router 20 blocks target-addressed DNS replies and UDP subsequent fragments in principle but passes DNS replies that correspond to the exceptional setting, received from the controller 10 (S5). For example, the border router 20 blocks target-addressed DNS replies and UDP subsequent fragments in principle but passes DNS replies, whose transmission source is an authorized DNS server 50 that has received the DNS request from the target, even though the destination of the DNS reply is the target. Thus, authorized DNS replies can reach the target.

(The Initial State→the List Preparation State)

Figure 2:
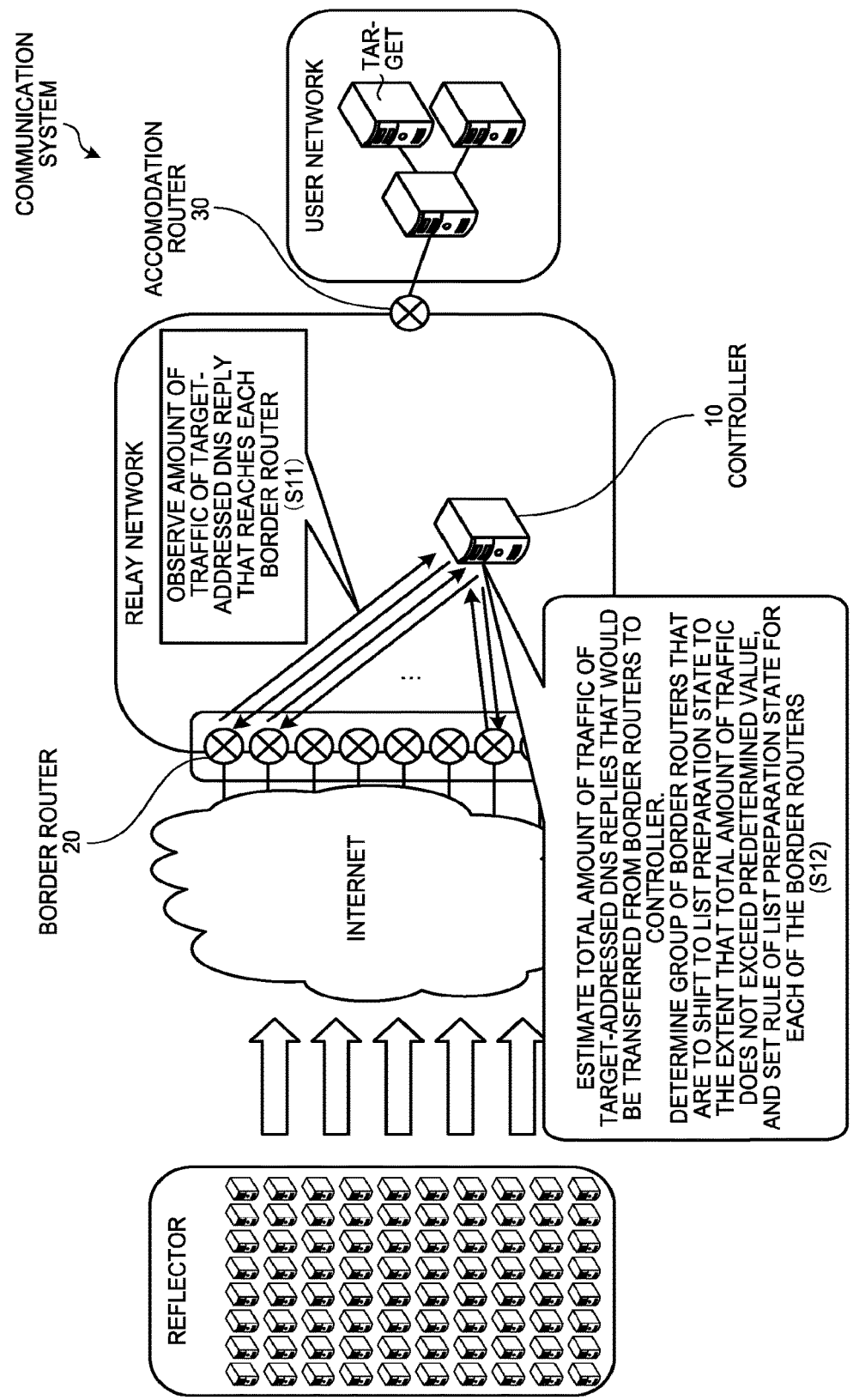
FIG. 2 is a diagram that illustrates a schematic operation of the communication system in the initial state→the list preparation state.

Next, by using FIG. 2, an explanation is given of a shift from the initial state to the list preparation state in each of the border routers 20. For example, the controller 10 observes the amount of traffic of target-addressed DNS reply that reaches each of the border routers 20 (S11). Then, on the basis of the amount of traffic of target-addressed DNS reply that reaches each of the border routers 20, the controller 10 estimates the total amount of traffic of target-addressed DNS replies that would be transferred from the border routers 20 to the controller 10 when the border routers 20 shift to the list preparation state. Then, the controller 10 determines the group of the border routers 20 that are to shift to the list preparation state to the extent that the total amount of traffic does not exceed a predetermined value, and it sets the rule of the list preparation state for each of the border routers 20 in the group (S12).

The rule for the list preparation state here is the rule in which the corresponding border router 20 blocks (discards) target-addressed DNS replies and UDP subsequent fragments, samples a target-addressed DNS reply with the IP address that is not described in the black list (described later in detail) as the transmission source, and transfers it to the controller 10. Furthermore, the sampled target-addressed DNS reply is used by the controller 10 to generate the black list (described later in detail) of the border router 20. Moreover, in the list preparation state, too, "the exceptional setting of the rule", which is the same as that set in the initial state, is applied to the border router 20 so that DNS replies that correspond to the exceptional setting, received from the controller 10, are passed.

(The List Preparation State→the List Blocking State)

Figure 3:
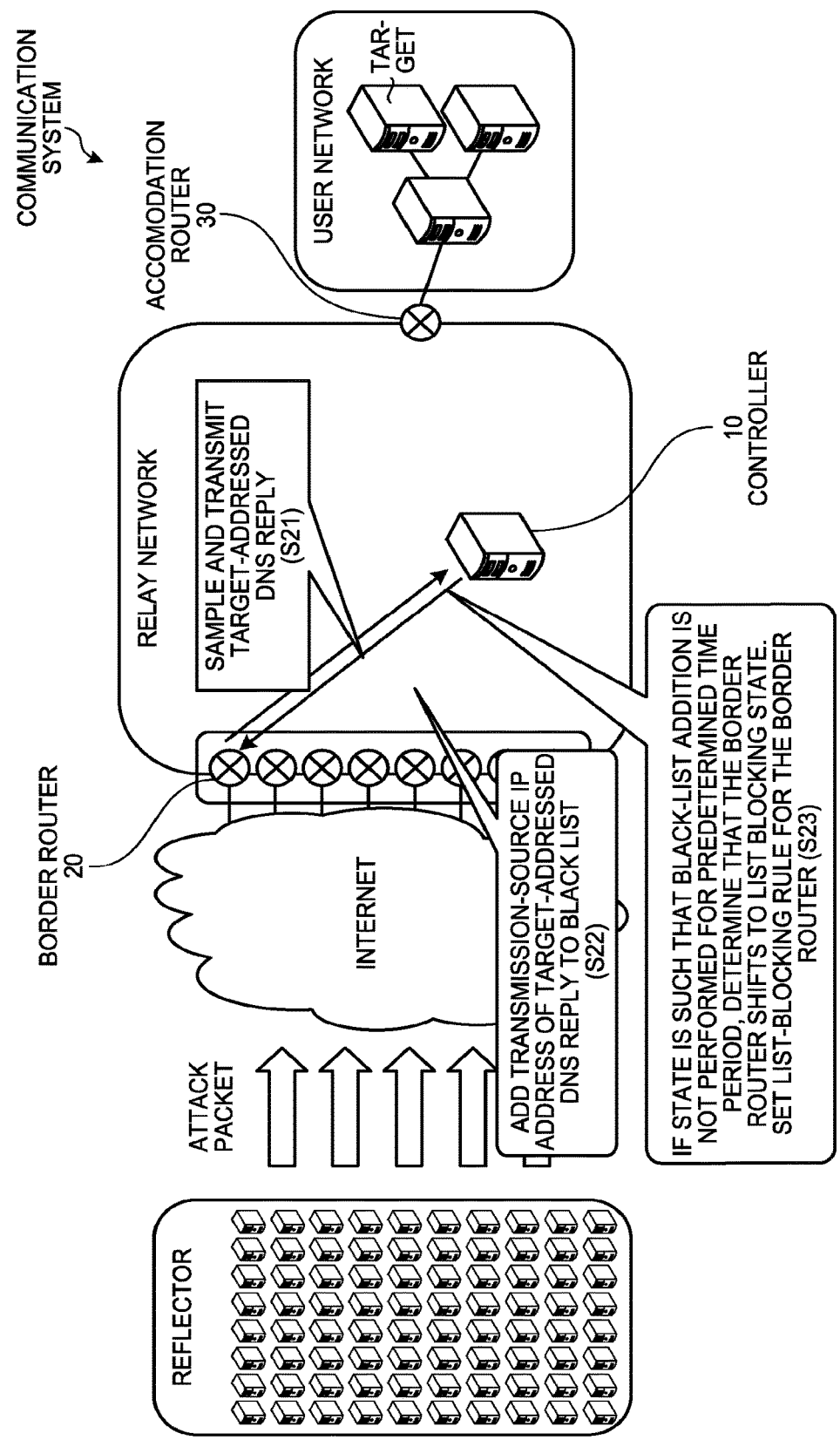
FIG. 3 is a diagram that illustrates a schematic operation of the communication system in the list preparation state→the list blocking state.

Next, by using FIG. 3, an explanation is given of a shift from the list preparation state to the list blocking state in each of the border routers 20. For example, the border router 20, which has shifted to the list preparation state, samples a target-addressed DNS reply with the IP address that is not described in the black list (described later in detail) as the transmission source from the received packets in accordance with the rule for the above-described list preparation state, and transmits it to the controller 10 (S21). Furthermore, just after the border router 20 shifts from the initial state to the list preparation state (that is, in the state where the black list has not been set yet), a target-addressed DNS reply is sampled from the received packet and is transmitted to the controller 10.

Then, after the target-addressed DNS reply, sampled by the border router 20, is received, the controller 10 adds the transmission-source IP address of the transmitted DNS reply to the black list of the border router 20 (S22). Then, the controller 10 monitors black-list addition (addition of a new IP address to the black list) state in the border router 20 that is in the list preparation state and, if the state is such that black-list addition is not performed for a predetermined time period, determines that the border router 20 shifts to the list blocking state. Then, the controller 10 sets the list-blocking rule for the border router 20 (S23).

That is, if it is determined that the state is such that almost all the IP addresses of attacker (e.g., reflectors) are registered in the black list of the border router 20 that is in the list preparation state, the controller 10 determines that the border router 20 shifts to the list blocking state. Then, the list-blocking rule is set in the border router 20.

Furthermore, the list-blocking rule here is the rule in which the corresponding border router 20 blocks target-addressed DNS replies and target-addressed UDP subsequent fragments with the IP address described in the black list as the transmission source. Furthermore, in the list blocking state, too, the border router 20 samples a target-addressed DNS reply from the IP address that is not described in the black list and transfers it to the controller 10. Furthermore, the "exceptional setting of the rule", which is the same as that is set in the initial state, is applied to the border router 20 so that the DNS replies that correspond to the exceptional setting, received from the controller 10, are passed.

In this way, after each of the border routers 20 shifts to the list blocking state, each of the border routers 20 blocks target-addressed DNS replies in principle but may pass DNS replies (i.e., allowable DNS replies) to DNS requests from the target. Furthermore, each of the border routers 20 blocks a target-addressed UDP subsequent fragment from the IP address described in the black list but may pass a target-addressed UDP subsequent fragment (i.e., allowable UDP subsequent fragment) from the IP address that is not described in the black list.

(Configuration)

Next, by using FIG. 4, an explanation is given of the configurations of the controller 10 and the border router 20. First, the configuration of the controller 10 is explained.

(Controller)

As illustrated in FIG. 4, the controller 10 includes a communication control unit 11, a storage unit 12, and a control unit 13.

The communication control unit 11 is a communication interface to transmit and receive data to and from external devices. The communication control unit 11 serves as a communication interface to, for example, transmit a rule from the control unit 13 to the border router 20 or acquire a result of sampling of a target-addressed DNS reply from the border router 20.

The storage unit 12 stores router information. The router information is the information that indicates the identification information on each of the border routers 20 that are provided in the relay network. As illustrated in FIG. 5, for example, the router information may include the state (the initial state, the list preparation state, the list blocking state) of each of the border routers 20 as well as the identification information on each of the border routers 20. The state of each of the border routers 20 is written by a state determining unit 132 (described later).

The control unit 13 performs the overall control on the controller 10, and here it principally transmits the rule with regard to packet transfer or blocking to the border router 20.

The control unit 13 includes an attack detecting unit 130, an observing unit 131, the state determining unit 132, a packet acquiring unit 133, a list generating unit 134, a packet-discarding commanding unit 135, a packet-transfer commanding unit 136, an exceptional-setting commanding unit 137, and a packet transferring unit 138.

The attack detecting unit 130 detects attacks to a target. For example, the attack detecting unit 130 acquires the traffic information from the accommodation router 30 and, if it is determined that DNS replies are centered on a predetermined destination (target) within the user network on the basis of the traffic information, detects an attack to the destination as a target.

The observing unit 131 observes the amount of traffic of target-addressed DNS reply in each of the border routers 20. For example, the observing unit 131 gives a command to each of the border routers 20 so as to measure the amount of traffic of DNS reply, which is addressed to the IP address of the target, and acquires a measurement result of the amount of traffic from the border router 20 at predetermined intervals.

The state determining unit 132 determines whether each of the border routers 20 enters the initial state, the list preparation state, or the list blocking state.

For example, on the basis of the amount of traffic of target-addressed DNS reply in each of the border routers 20, observed by the observing unit 131, the state determining unit 132 estimates the total amount of traffic of target-addressed DNS replies that would be transferred from the border routers 20 to the controller 10 if the border router 20 shifts to the list preparation state. Specifically, the state determining unit 132 estimates the total amount of traffic in the sampling result received from the border router 20 that has shifted to the list preparation state. Then, the state determining unit 132 determines the group of the border routers 20 that are to shift to the list preparation state among the border routers 20 that are in the initial state to the extent that the estimated total amount of traffic of DNS reply does not exceed a predetermined value.

Furthermore, for example, the state determining unit 132 monitors the addition status of the IP address to the black list in the border router 20 that is in the list preparation state and, if addition of the IP address to the black list is not performed for a predetermined period, determines that the border router 20 is to shift to the list blocking state. Specifically, if the black list of the border router 20, which is in the list preparation state, is matured to some extent, the state determining unit 132 determines that the border router 20 is to shift to the list blocking state.

Furthermore, the state determining unit 132 may refer to the amount of traffic of DNS reply, which is addressed to the IP address of the target, in the border router 20 that is in the list preparation state, observed by the observing unit 131, and the black list of the border router 20 and may determine that the border router 20 is to shift to the list blocking state if the amount of per-hour traffic of DNS reply (target-addressed black-list excluded reply packet), which is addressed to the IP address of the target from the IP address that is not described in the black list of the border router 20, is equal to or less than a predetermined value.

The packet acquiring unit 133 samples target-addressed DNS reply, received by the border router 20 that is in the list preparation state or the list blocking state. For example, the packet acquiring unit 133 receives, from the border router 20 that is in the list preparation state or the list blocking state, DNS reply that is sampled at a predetermined rate with regard to the target-addressed black-list excluded reply packet that is received by the border router 20.

The list generating unit 134 generates the black list of each of the border routers 20. Specifically, the list generating unit 134 adds the transmission-source IP address of the DNS reply, which is received by the border router 20 and is sampled by the packet acquiring unit 133, to the black list of the border router 20. Here, the black list is the list that is referred to when the border router 20 in the list blocking state blocks target-addressed UDP subsequent fragments.

The packet-discarding commanding unit 135 gives a command to each of the border routers 20 in accordance with the state of each of the border routers 20 as to which packet is to be blocked (discarded).

For example, the packet-discarding commanding unit 135 sets the rule for the border router 20, which is in the initial state, that, when any of a target-addressed DNS reply and a target-addressed UDP subsequent fragment is received, the packet is to be discarded.

Furthermore, for example, the packet-discarding commanding unit 135 sets the rule for the border router 20, which is in the list blocking state, that, when any of a target-addressed DNS reply and a target-addressed UDP subsequent fragment with the IP address described in the black list as the transmission source is received, the packet is to be discarded.

Furthermore, for example, the packet-discarding commanding unit 135 sets the rule for the border router 20, which is in the list preparation state, that, when any of a target-addressed DNS reply and a target-addressed UDP subsequent fragment is received, the packet is to be discarded.

The packet-transfer commanding unit 136 gives a command to the accommodation router 30 that, when the accommodation router 30 receives a DNS request from the target, the DNS request is to be transferred to the controller 10.

When a DNS request is received from the target via the accommodation router 30, the exceptional-setting commanding unit 137 sets the rule (exception) for each of the border routers 20 that a DNS reply, whose transmission-source IP address is the destination IP address of the DNS request, is excluded from discarding. Thus, each of the border routers 20 may pass a DNS reply (i.e., allowable DNS reply) to a DNS request from the target. Furthermore, if an attack is detected, the exceptional-setting commanding unit 137 sets the rule for the accommodation router 30 that a DNS request from the target is transferred to the controller 10. Thus, after an attack is detected, DNS requests from the target reach the controller 10. Furthermore, the exceptional-setting commanding unit 137 deletes the setting of the above-described exception in the border router 20 after a predetermined time elapses.

After the exceptional-setting commanding unit 137 sets the exceptional rule for each of the border routers 20, the packet transferring unit 138 transfers the DNS request, received from the accommodation router 30, to any of the border routers 20.

(Border Router)

As illustrated in FIG. 4, the border router 20 includes a communication control unit 21, a storage unit 22, and a control unit 23.

The communication control unit 21 is a communication interface to transmit and receive data to and from external devices. The communication control unit 21 serves as, for example, a communication interface for transmitting/receiving various types of packets, receiving rules from the controller 10, receiving sampling results of target-addressed DNS replies, or the like.

The storage unit 22 stores a routing table and rule information.

The routing table is the route information that is referred to when the control unit 23 determines the forward destination of a packet.

The rule information is the information that indicates the rules related to packet processing (passing, blocking (discarding), transferring, or the like) in the border router 20. The rule information is transmitted by the controller 10. In accordance with the state of the border router 20, for example, the rule in any of the states illustrated in FIG. 6 is set in the border router 20 as the rule information. Specifically, the rule of the initial state is set in the border router 20 that is in the initial state, the rule of the list preparation state is set in the border router 20 that is in the list preparation state, and the rule of the list blocking state is set in the border router 20 that is in the list blocking state. Furthermore, the rule of each state, illustrated in FIG. 6, also describes rule exceptions.

The rule of the initial state, illustrated in FIG. 6, is that (1) target-addressed DNS replies and UDP subsequent fragments are blocked in principle. This rule sets the exception that (2) DNS replies to DNS requests, transferred from the controller 10, are passed.

Furthermore, in addition to the above-described rule of (1) and the exception of (2), the rule of the list preparation state, illustrated in FIG. 6, includes the rule that (3) a target-addressed black-list excluded reply packet is sampled and is transmitted to the controller 10.

Furthermore, in addition to the above-described exception of (2) and the rule of (3), the rule of the list blocking state, illustrated in FIG. 6, includes the rule that target-addressed DNS replies and target-addressed UDP subsequent fragments with the IP address described in the black list as the transmission source are blocked in principle, as described in (1).

Furthermore, although the illustration is here omitted, the rule information also contains the black list that is used by each of the border routers 20 or the value of the sampling percentage (sampling rate) when each of the border routers 20 samples a target-addressed DNS reply.

A transfer control unit 232 (described later) of the control unit 23 basically determines the forward destination of a packet by using the routing table; however, if the rule is set, the rule is applied so that the forward destination of a packet is determined, a packet is discarded, discarding of a packet is stopped, or the like.

The control unit 23 controls transfer of packets or discards them on the basis of the rule (and the exception) related to packet transfer or discarding, received from the controller 10.

The control unit 23 includes a rule managing unit 231, the transfer control unit 232, a traffic-amount measuring unit 233, and a sampling unit 234.

When the rule and the exception are received via the communication control unit 21, which are transmitted from the controller 10, the rule managing unit 231 stores the rule and the exception as the rule information in the storage unit 22. Furthermore, when a command to delete the rule or the exception is received from the controller 10 via the communication control unit 21, the rule managing unit 231 accordingly deletes the deletion-target rule.

The transfer control unit 232 controls packet transfer by using the routing table in the storage unit 22. Here, if the storage unit 22 contains the rule (and its exception) that corresponds to the rule information, the transfer control unit 232 also refers to the rule (and its exception) and controls transfer of packets and discards packets.

For example, if the rule information contains the rule of the list blocking state, illustrated in FIG. 6, the transfer control unit 232 accordingly blocks target-addressed DNS replies and target-addressed UDP subsequent fragments with the IP address described in the black list as the transmission source in principle but passes DNS replies to DNS requests that are transmitted from the controller 10. Furthermore, target-addressed black-list excluded reply packets are transmitted to the controller 10.

Furthermore, the transfer control unit 232 may determine whether a received packet is a DNS reply by checking the transmission-source port number. For example, if the transmission-source port number of a received packet=53, the transfer control unit 232 determines that the received packet is a DNS reply. Furthermore, it may be determined whether a received packet is a UDP subsequent fragment by checking the IP header of the packet. For example, if the protocol number of a received packet=17 (UDP) and the value of the offset field>0 (indicating that it is a subsequent fragment), the transfer control unit 232 determines that the received packet is a UDP subsequent fragment.

In accordance with a command from the observing unit 131 in the controller 10, the traffic-amount measuring unit 233 measures the amount of traffic that is received by the border router 20 of its own. For example, if the border router 20 is in the initial state, the traffic-amount measuring unit 233 measures the amount of per-hour traffic of target-addressed DNS reply that is received by the border router 20 in accordance with a command from the observing unit 131 in the controller 10, and transmits it to the controller 10. Furthermore, if the border router 20 is in the list preparation state or the list blocking state, the traffic-amount measuring unit 233 measures the amount of per-hour traffic of target-addressed DNS reply packet with the IP address that is not described in the black list as the transmission source, received by the border router 20, in accordance with a command from the observing unit 131 in the controller 10, and transmits it to the controller 10.

The sampling unit 234 samples a target-addressed DNS reply, received by the transfer control unit 232, and transmits it to the controller 10. For example, if the border router 20 is in the list preparation state or the list blocking state, the sampling unit 234 samples a target-addressed black-list excluded reply packet, received by the transfer control unit 232, at a predetermined rate and transmits it to the controller 10. Here, the rate for sampling may be all or some of the received target-addressed DNS replies.

(Steps of a Process)

Next, the steps of a process of the communication system are explained by using FIG. 7 to FIG. 9. Here, an explanation is given of, for example, a case where the controller 10 performs control on border routers 20A, 20B.

(The Initial State)

When the controller 10 detects an attack on the target on the basis of the traffic information on the accommodation router 30 (S212: attack detection), the rule of the initial state is set in the border routers 20A, 20B (S213, S214). Specifically, if the attack detecting unit 130 of the controller 10 detects an attack, the packet-discarding commanding unit 135 sets the rule for the border routers 20A, 20B that DNS replies and UDP subsequent fragments, addressed to the target of the attack, are blocked in principle.

After receiving the setting of the above-described rule, the border routers 20A, 20B block target-addressed DNS replies and UDP subsequent fragments in principle (S215, S216).

Furthermore, the controller 10 sets the rule for the accommodation router 30 (S217). The rule here is the rule that, when a DNS request is received from the target, the DNS request is transferred to the controller 10. If the accommodation router 30, to which the above rule has been set, receives a DNS request from the target, it transfers the DNS request to the controller 10 (S218).

Afterward, if the controller 10 receives a DNS request from the target via the accommodation router 30, the exceptional-setting commanding unit 137 specifies the exceptional setting for the border routers 20A, 20B that DNS replies to the DNS request are passed (S219, S220). Then, the packet transferring unit 138 transfers the DNS request, received via the accommodation router 30, to any of the border routers 20 (e.g., the border router 20B) (S221).

The controller 10 specifies the above-described setting for the border routers 20A, 20B so that the border routers 20A, 20B block target-addressed DNS replies and UDP subsequent fragments in principle but pass DNS replies (allowable DNS replies) to DNS requests from the target.

(The Initial State→the List Preparation State)

After the controller 10 shifts each of the border routers 20 to the initial state as described above, the observing unit 131 of the controller 10 observes the amount of traffic of the border routers 20A, 20B at a predetermined interval (S231 of FIG. 8). For example, the observing unit 131 gives a command to the border routers 20A, 20B to measure the amount of traffic of target-addressed DNS reply, and it acquires a measurement result of the amount of traffic from the border routers 20A, 20B due to polling, or the like, at a predetermined interval.

Then, on the basis of the observed amount of traffic of each of the border routers 20 (the border routers 20A, 20B), the state determining unit 132 of the controller 10 determines the border router 20 that is to shift to the list preparation state (S232). For example, on the basis of the amount of traffic of target-addressed DNS reply in the border routers 20A, 20B, observed by the observing unit 131, the state determining unit 132 estimates the total amount of per-hour traffic of the sampling result of DNS replies that would be transmitted from the border routers 20A, 20B if the border routers 20A, 20B shift to the list preparation state. Then, the state determining unit 132 determines the group of the border routers 20, which are to shift to the list preparation state, among the border routers 20 that are in the initial state to the extent that the estimated total amount of traffic does not exceed a predetermined value. Furthermore, by referring to the router information (see FIG. 5), it may be determined which of the border routers 20 is in the initial state.

Next, the packet-discarding commanding unit 135 of the controller 10 sets the rule of the list preparation state for the border routers 20 (e.g., the border routers 20A, 20B) that it is determined are to shift to the list preparation state (S233, S234). Specifically, the packet-discarding commanding unit 135 of the controller 10 sets the rule for the border routers 20A, 20B that target-addressed DNS replies and UDP subsequent fragments are blocked in principle. Furthermore, the packet acquiring unit 133 of the controller 10 sets the rule for the border routers 20A, 20B that a target-addressed black-list excluded reply packet is sampled and is transmitted to the controller 10. Here, the exceptional settings, set at S219, S220, are continuously applied to the border routers 20A, 20B.

Then, after receiving the setting of the above-described rule, the border routers 20A, 20B block target-addressed DNS replies and UDP subsequent fragments in principle, sample a target-addressed black-list excluded reply packet, and transmits it to the controller 10 (S235, S236). Here, according to the exceptional setting that is set at S219, S220, the border routers 20A, 20B pass DNS replies (allowable DNS replies) to DNS requests from the target.

After a sampling result (target-addressed black-list excluded reply packet) is received from the border routers 20A, 20B (S237, S238), the list generating unit 134 of the controller 10 gives a command to the border routers 20A, 20B to add the transmission-source IP address, included in the sampling result, to the black lists of the border routers 20A, 20B (S239: black-list addition command). Specifically, the list generating unit 134 gives a command to the border router 20A to add the transmission-source IP address, included in the sampling result from the border router 20A, to the black list. Furthermore, the list generating unit 134 gives a command to the border router 20B to add the transmission-source IP address, included in the sampling result from the border router 20B, to the black list. Each time a sampling result is received from the border router 20 (20A, 20B) as described above, the list generating unit 134 gives a command to the border router 20 to add the transmission-source IP address, included in the sampling result, to the black list. Thus, the IP address of the transmission source (e.g., the reflector in FIG. 1) of an attack packet is stored in the black lists of the border routers 20A, 20B.

(The List Preparation State→the List Blocking State)

Next, the state determining unit 132 of the controller 10 determines the border router 20, which is to shift to the list blocking state, in accordance with the addition status (the degree of maturity of the black list) of the IP address to the black lists of the border routers 20A, 20B (S240 of FIG. 9). For example, the state determining unit 132 monitors the addition status of the IP address to the black lists of the border routers 20A, 20B and, if addition of an IP address is not performed for equal to or more than a predetermined period, determines that the black list of the border router 20 is matured, and determines that the border router 20 shifts to the list blocking state.

Then, the packet-discarding commanding unit 135 of the controller 10 sets the rule of the list blocking state for the border router 20 (e.g., the border routers 20A, 20B) that it is determined is to shift to the list blocking state (S241, S242). Specifically, the packet-discarding commanding unit 135 of the controller 10 sets the rule for the border routers 20A, 20B that target-addressed DNS replies and target-addressed UDP subsequent fragments with the IP addresses described in the black list as the transmission source are blocked in principle. Here, the border routers 20A, 20B continuously use the rule that a target-addressed black-list excluded reply packet is sampled and is transmitted to the controller 10, which is set at S233, S234, and the exceptional setting that is set at S219, S220.

Furthermore, after receiving the setting of the above-described rule, the border routers 20A, 20B block in principle target-addressed DNS replies and target-addressed UDP subsequent fragments with the IP address described in the black list as the transmission source. Furthermore, a target-addressed black-list excluded reply packet is sampled and transmitted (S243, S244). Furthermore, in accordance with the exceptional setting that is set at S219, S220, the border routers 20A, 20B pass DNS replies (allowable DNS replies) to DNS requests from the target. Furthermore, as is the case with S239, each time a sampling result (target-addressed black-list excluded reply packet) is received from the border routers 20A, 20B, the list generating unit 134 of the controller 10 gives a command to the border routers 20A, 20B to add the transmission-source IP address, included in the sampling result, to the black lists of the border routers 20A, 20B. Thus, even if an attack packet is transmitted to the target from a new attacker, the list generating unit 134 of the controller 10 may add the IP address of the attacker to the black list.

In this manner, if reflective DDoS attacks, or the like, are conducted, the communication system identifies attack packets with regard to subsequent fragments and blocks them by using the border router 20. Furthermore, the communication system passes DNS replies (allowable DNS replies) to DNS requests from the attack target. Therefore, the communication system may block most of the attack packets and pass allowable packets.

Furthermore, after an attack is detected, the communication system blocks target-addressed DNS replies and UDP subsequent fragments and, after it is confirmed that the black list is matured to some extent, blocks target-addressed UDP subsequent fragments by using the black list. This allows the communication system to reduce attacks that use unauthorized UDP subsequent fragments. Furthermore, as it is automatically detected that the black list is matured to some extent, the communication system may promptly restore communication of allowable UDP subsequent fragments.

Furthermore, in the communication system, when the border router 20 shifts from the initial state to the list preparation state, a shift is made such that the total amount of traffic, received by the controller 10 from the border router 20, falls within a predetermined range; thus, it is possible to prevent the controller 10 from being in an overloaded state. Furthermore, the communication system may generate the black list of each of the border routers 20 by making maximal use of the amount of load that can be processed by the controller 10.

(Other Embodiments)

Furthermore, when the state determining unit 132 of the controller 10 determines the border router 20, which is to shift to the list preparation state, among the group of the border routers 20 that are in the initial state, there is a possibility that the relay network contains the border router 20 that has already shifted to the list blocking state. In such a case, the state determining unit 132 also needs to consider the amount of traffic of target-addressed DNS replies that are transferred from the border router 20 in the list blocking state to the controller 10. Therefore, the state determining unit 132 uses the following Equation (2) to calculate the total amount of traffic of target-addressed DNS replies that would be transferred from each of the border routers 20 to the controller 10.

$$T\_1 * r\_1 + T\_2 * r\_2 \qquad \text{Equation (2)}$$

T_1: the total amount of per-hour traffic of target-addressed black-list excluded reply packet that is received by each of the border routers 20 that are in the list preparation state T_2: the total amount of per-hour traffic of target-addressed black-list excluded reply packet that is received by each of the border routers 20 that are in the list blocking state r_1: the sampling percentage of reply packets in each of the border routers 20 that are in the list preparation state (specifically, the percentage of reply packets that are acquired by the packet acquiring unit 133 of the controller 10 among the target-attack addressed reply packets of a predetermined service, received by each of the border routers 20 that are in the list preparation state)

r_2: the sampling percentage of reply packets in each of the border routers 20 that are in the list blocking state (specifically, the percentage of reply packets that are acquired by the packet acquiring unit 133 of the controller 10 among the target-attack addressed reply packets of a predetermined service, received by each of the border routers 20 that are in the list blocking state)

In this manner, even if the relay network contains the border router 20 that is in the list blocking state, the state determining unit 132 may calculate the total amount of traffic of target-addressed DNS replies that would be transferred from each of the border routers 20 to the controller 10. As a result, the state determining unit 132 may accurately calculate the total amount of traffic of target-addressed DNS replies that would be transferred from each of the border routers 20 to the controller 10.

Furthermore, upon reception of any of an attack-target addressed reply packet of a predetermined service and an attack-target addressed fragmented packet with the IP address described in the black list as the transmission source, the packet-discarding commanding unit 135 of the controller 10 gives a command to the border router 20, which is in the list blocking state, to discard the packet; however, this is not a limitation. For example, upon reception of an attack-target addressed packet with the IP address described in the black list as the transmission source, the packet-discarding commanding unit 135 may give a command to the border router 20 in the list blocking state to discard the packet. In this manner, too, the border router 20 may discard attack packets due to the attack communication.

Furthermore, in the communication system, the black list may be generated and managed by the side of each border router. A controller 100 and a border router 200 in this case are explained by using FIG. 10. The same configuration as that in the above-described embodiment is attached with the same reference numeral, and its explanation is omitted.

For example, if concentration of DNS replies to a predetermined address (an attack on the target) is detected, the controller 100 gives the following command to each of the border routers 200. Specifically, upon reception of a target-addressed DNS reply with the IP address that is not described in the black list, included in the border router 200 of its own, as the transmission source, the controller 100 gives a command to each of the border routers 200 to add the IP address to the black list. Furthermore, upon reception of a target-addressed DNS reply and a UDP subsequent fragment with the IP address described in the black list as the transmission source, the controller 100 gives a command to each of the border routers 200 to block it. Furthermore, the controller 100 sets the exceptional setting for each of the border routers 200 that DNS replies to target-addressed DNS requests are passed. Specifically, the controller 100 sets the exceptional setting for each of the border routers 200 that allowable DNS replies are passed. This also allows the communication system to block most of the attack packets and to pass allowable packets.

Figure 10:
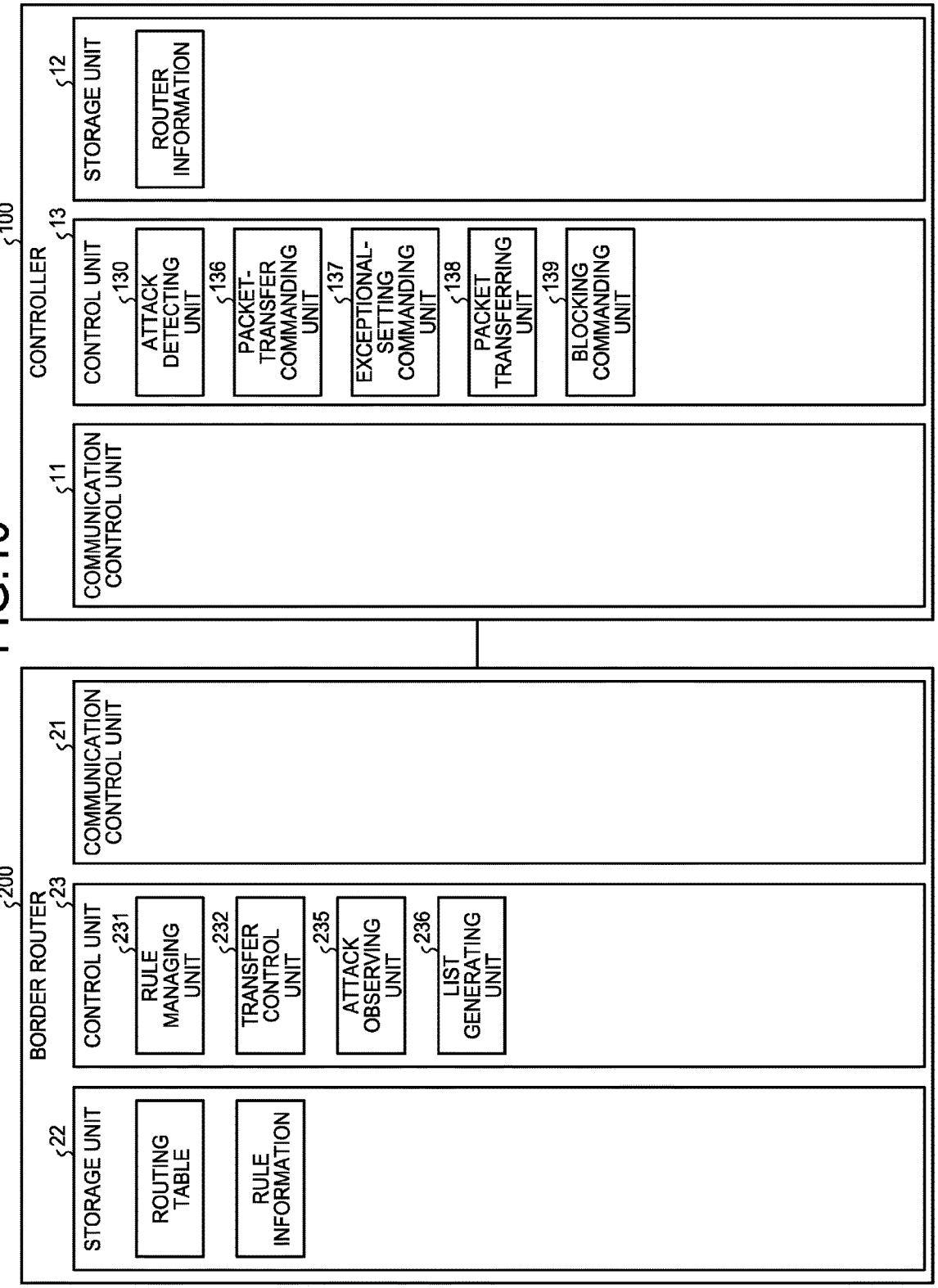
FIG. 10 is a functional block diagram of a controller and a border router.

As illustrated in FIG. 10, the control unit 13 of the controller 100 includes the attack detecting unit 130, the packet-transfer commanding unit 136, the exceptional-setting commanding unit 137, the packet transferring unit 138, and a blocking commanding unit 139. If the attack detecting unit 130 detects an attack, the blocking commanding unit 139 makes a notification of the IP address of the target and makes a blocking setting command to each of the border routers 200. Here, the blocking setting command is the command to block target-addressed DNS replies and UDP subsequent fragments whose transmission sources are the IP addresses that are described in the black list included in the border router 200 of its own and, upon reception of a target-addressed DNS reply whose transmission source is the IP address that is not described in the black list included in the border router 200 of its own, add the IP address to the black list.

Furthermore, the control unit 23 of the border router 200 includes the rule managing unit 231, the transfer control unit 232, an attack observing unit 235, and a list generating unit 236. After receiving the notification of the IP address of the target and the blocking setting command from the blocking commanding unit 139, the attack observing unit 235 observes packets as described below. Specifically, the attack observing unit 235 observes packets that are transferred by the transfer control unit 232 and the communication control unit 21 and, upon reception of a target-addressed DNS reply with the IP address that is not described in the black list as the transmission source, notifies the IP address to the list generating unit 236. After receiving the notification, the list generating unit 236 adds the IP address to the black list. Furthermore, after receiving the notification of the IP address of the target and the blocking setting command from the blocking commanding unit 139, the rule managing unit 231 specifies the blocking setting in the rule information. Specifically, the rule managing unit 231 sets, in the rule information in the storage unit 22, the rule that target-addressed DNS replies are blocked. Furthermore, each time a new IP address is added to the black list, the rule managing unit 231 sets, in the rule information in the storage unit 22, the rule that a UDP subsequent fragment with the IP address as the transmission source is blocked.

Figure 11:
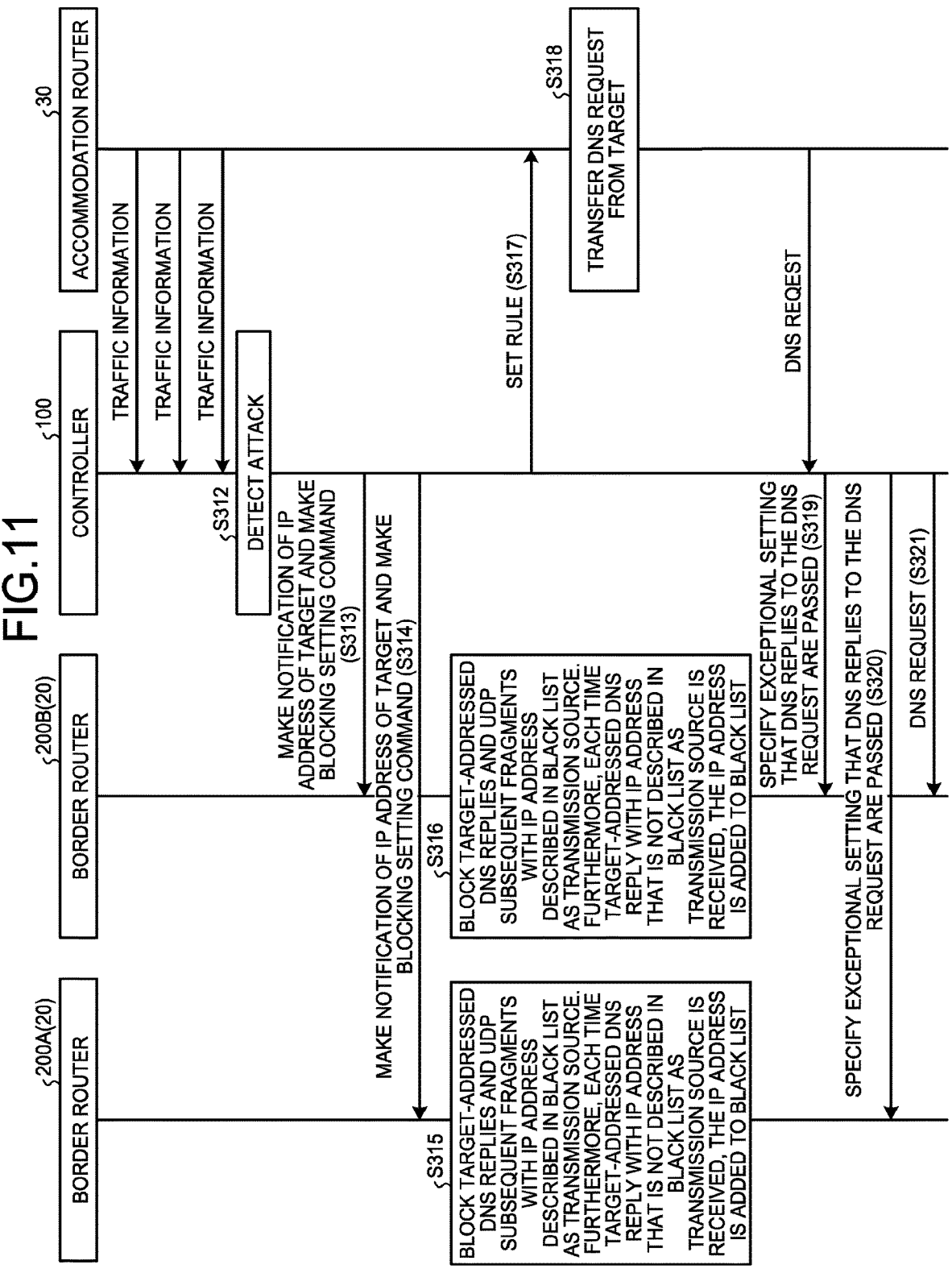
FIG. 11 is a sequence diagram that illustrates an example of the steps of the process of the communication system that includes the controller and the border router, illustrated in FIG. 10.

Next, by using FIG. 11, an explanation is given of the steps of a process of the communication system that includes the controller 100 and the border router 200, illustrated in FIG. 10. Here, an explanation is given of, for example, a case where the controller 100 performs a control on border routers 200A, 200B.

First, if the controller 100 detects an attack on the target on the basis of the traffic information in the accommodation router 30 (S312: attack detection), the blocking commanding unit 139 makes a notification of the IP address of the target and makes a blocking setting command to the border routers 200A, 200B (S313, S314).

After receiving the above-described notification of the IP address of the target and the blocking setting command, the border routers 200A, 200B block in principle target-addressed DNS replies and UDP subsequent fragments with the IP address described in the black list as the transmission source. Furthermore, each time a target-addressed DNS reply with the IP address that is not described in the black list as the transmission source is received, the border routers 200A, 200B add the IP address to the black list (S315, S316).

Furthermore, the controller 100 sets the rule for the accommodation router 30 in the same manner as the above-described controller 10 (S317). The rule here is the rule that, when a DNS request is received from the target, the DNS request is transferred to the controller 100. When a DNS request is received from the target by the accommodation router 30, for which the above-described rule is set, the DNS request is transferred to the controller 100 (S318).

Afterward, if the controller 100 receives a DNS request from the target via the accommodation router 30, the exceptional-setting commanding unit 137 specifies, for the border routers 200A, 200B, the exceptional setting that a DNS reply to the DNS request is passed (S319, S320). Then, the packet transferring unit 138 transfers the DNS request, received via the accommodation router 30, to any of the border routers 200 (e.g., the border router 200B) (S321).

In this manner, too, the communication system may block most of the attack packets and pass allowable packets. Furthermore, in the case of the above-described communication system, each of the border routers 200 itself generates the black list at the time of attack detection. That is, as the controller 100 does not need to sample a packet from the border router 200, each of the border routers 200 may promptly start to generate the black list at the time of attack detection and may perform blocking on the attack. Here, the above-described border router 200 blocks target-addressed DNS replies and UDP subsequent fragments with the IP address described in the black list as the transmission source; however, all the attack-target addressed packets with the IP address described in the black list as the transmission source may be blocked.

Figure 12:
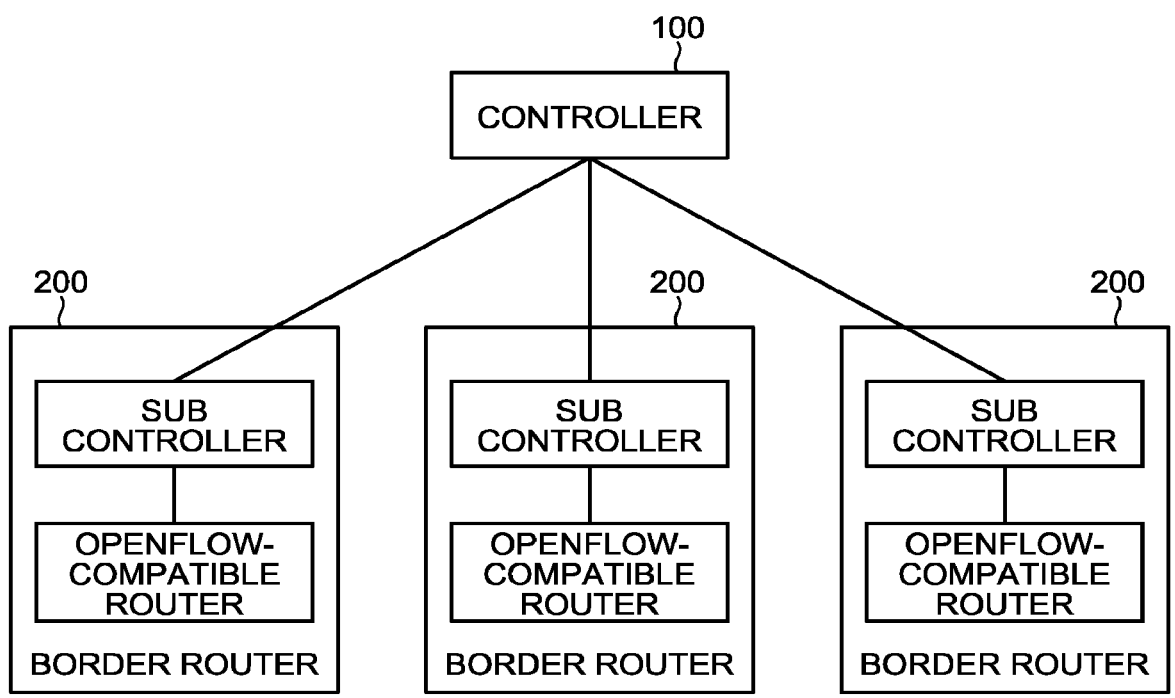
FIG. 12 is a diagram that illustrates an example of the controller and the border router that are illustrated in FIG. 10.

Furthermore, as illustrated in FIG. 12, for example, the above-described border router 200 may be implemented by using an OpenFlow-compatible router and a sub controller that receives control of the controller 100. As the sub controller has a general-purpose calculation capability, the border router 200 itself may manage the black list. Specifically, the functions of the communication control unit 21, the storage unit 22, and the transfer control unit 232 of the control unit 23 in the border router 200, illustrated in FIG. 10, are implemented by the OpenFlow-compatible router, and the functions of the communication control unit 21, the storage unit 22, and the rule managing unit 231, the attack observing unit 235, and the list generating unit 236 of the control unit 23 in the border router 200 are implemented by the sub controller.

An example of the steps of a process in a case where the border router 200 is implemented by the OpenFlow-compatible router and the sub controller as described above is described below.

First, when an attack is detected, the controller 100 makes a notification of the IP address of the target and makes a blocking setting command to the sub controller of each of the border routers 200. Next, after receiving the notification of the IP address of the target and the blocking setting command, the sub controller gives the following two commands to the OpenFlow-compatible router (that is, the OpenFlow-compatible router of the border router 200 that is provided with the sub controller) that is managed by itself. Specifically, with regard to the sub controller, (1) upon reception of a packet with the IP address that is not described in the black list as the transmission source among target-addressed DNS replies, the packet is transferred to the sub controller. (2) Target-addressed DNS replies and UDP subsequent fragments with the IP address described in the black list as the transmission source are blocked. Then, in accordance with the command of (1), if the sub controller receives a packet that is transferred from the OpenFlow-compatible router, which is managed by itself, the transmission-source IP address of the packet is added to the black list.

Furthermore, if a DNS request is received from the target via the accommodation router 30, the controller 100 specifies the exceptional setting for the sub controller of each of the border routers 200 that a DNS reply to the DNS request is passed. After receiving the above-described exceptional setting, the sub controller gives a command to the OpenFlow-compatible router, which is managed by itself, to pass a DNS reply to the DNS request. This allows the border router 200 to pass allowable packets from the target.

(Program)

Furthermore, it is also possible to generate and execute a control program that describes the process performed by the controllers 10, 100, and the border routers 20, 200 according to the above-described embodiment in a computer executable language. In this case, the computer executes the program so that the same advantage as that in the above-described embodiment may be obtained. Furthermore, the program may be recorded in a computer-readable recording medium and the program, recorded in the recording medium, is read and executed by the computer so that the same process as that in the above-described embodiment is performed. An explanation is given below of an example of the computer that executes the control program that performs the same functions as those of the controllers 10, 100 and the border routers 20, 200.

FIG. 13 is a diagram that illustrates the computer that executes the control program. As illustrated in FIG. 13, a computer 1000 includes, for example, a memory 1010, a CPU (Central Processing Unit) 1020, a hard-disk drive interface 1030, a disk drive interface 1040, a serial port interface 1050, a video adapter 1060, and a network interface 1070. Each of the units is connected with a bus 1080.

The memory 1010 includes a ROM (Read Only Memory) 1011 and a RAM (Random Access Memory) 1012. The ROM 1011 stores boot programs, such as BIOS (Basic Input Output System). The hard-disk drive interface 1030 is connected to a hard disk drive 1090. The disk drive interface 1040 is connected to a disk drive 1100. A removable storage medium, such as a magnetic disk or an optical disk, is inserted into the disk drive 1100. For example, a mouse 1110 and a keyboard 1120 are connected to the serial port interface 1050. For example, a display 1130 is connected to the video adapter 1060.

Here, as illustrated in FIG. 13, the hard disk drive 1090 stores, for example, an OS 1091, an application program 1092, a program module 1093, and program data 1094. The router information, the rule information, or the like, described in the above-described embodiment, is stored in, for example, the hard disk drive 1090 or the memory 1010.

Furthermore, for example, the control program is stored in the hard disk drive 1090 as a program module that describes commands that are executed by the computer 1000. Specifically, the program module, which describes each process that is performed by the controller 10, explained in the above-described embodiment, is stored in the hard disk drive 1090.

Furthermore, the data used for information processing by the control program is stored as program data in, for example, the hard disk drive 1090. Furthermore, the CPU 1020 loads the program module 1093 or the program data 1094, stored in the hard disk drive 1090, into the RAM 1012 as needed to perform each of the above-described steps.

Furthermore, the program module 1093 or the program data 1094 related to the control program is not necessarily stored in the hard disk drive 1090 and, for example, it may be stored in a removable storage medium and read by the CPU 1020 via the disk drive 1100, or the like. Alternatively, the program module 1093 or the program data 1094 related to the control program may be stored in a different computer, connected via a network, such as a LAN (Local Area Network) or a WAN (Wide Area Network), and read by the CPU 1020 via the network interface 1070.

REFERENCE SIGNS LIST 10, 100 CONTROLLER (CONTROL DEVICE)
20, 200 BORDER ROUTER

30 ACCOMMODATION ROUTER
130 ATTACK DETECTING UNIT
131 OBSERVING UNIT
132 STATE DETERMINING UNIT
133 PACKET ACQUIRING UNIT
134 LIST GENERATING UNIT
135 PACKET-DISCARDING COMMANDING UNIT
136 PACKET-TRANSFER COMMANDING UNIT
137 EXCEPTIONAL-SETTING COMMANDING UNIT
138 PACKET TRANSFERRING UNIT
139 BLOCKING COMMANDING UNIT
231 RULE MANAGING UNIT
232 TRANSFER CONTROL UNIT
233 TRAFFIC-AMOUNT MEASURING UNIT
234 SAMPLING UNIT
235 ATTACK OBSERVING UNIT
236 LIST GENERATING UNIT

The invention claimed is:

1. A control device that gives a command to each of border routers, connecting networks, so as to control transfer of packets, comprising:
processing circuitry configured to,
upon detection of an attack due to concentration of reply packets of a predetermined service,
acquire at least some of reply packets of a predetermined service, addressed to a target of the attack and received by the border routers;
add a transmission-source IP address of the acquired reply packet to a black list of the border router;
upon reception of a first type of packet, which is any of a reply packet of the predetermined service, addressed to the target of the attack, and a fragmented packet, addressed to the target of the attack, with an IP address described in the black list as a transmission source, provide a command to the border router so as to discard the first type of packet; and
after the attack is detected, upon reception of a request packet of the predetermined service from the IP address of the target of the attack, the processing circuitry gives a command to each of the border routers so as to set an exception rule to exclude a second type of packet, which is any of a reply packet of the predetermined service and a fragmented packet, whose transmission-source IP address is a destination IP address of the received request packet, from the discarding.

2. The control device according to claim 1, wherein the processing circuitry is further configured to
monitor an addition state of an IP address to a black list of each border router that is in a list preparation state and,
when addition of an IP address to the black list of the border router is not conducted for a predetermined period, determine that a state of the border router is to shift from the list preparation state to a list blocking state, wherein
with regard to a border router that is determined to shift to the list blocking state, upon reception of the first type of packet that is any of a reply packet of the predetermined service, addressed to the target of the attack, and a fragmented packet, addressed to the target of the attack, with an IP address described in the black list as a transmission source, the processing circuitry
gives a command to the border router so as to discard the first type of packet, and
upon reception of any of a third type of packet that is any of a reply packet of the predetermined service, addressed to the target of the attack, and a fragmented packet addressed to the target of the attack, gives a command to a border router in the list preparation state so as to discard the third type of packet.

3. The control device according to claim 1, wherein the processing circuitry is further configured to, when an amount of per-hour traffic of a target-addressed black-list excluded reply packet, which is a reply packet with an IP address that is not described in the black list as a transmission source, among reply packets of the predetermined service, addressed to the target of the attack and received by a border router that is in the list preparation state, becomes equal to or less than a predetermined value, determine that the border router shifts from a list preparation state to a list blocking state, wherein
with regard to a border router that is determined to shift to the list blocking state, upon reception of any of the first type of packet that is any of a reply packet of the predetermined service, addressed to the target of the attack, and a fragmented packet, addressed to the target of the attack, with an IP address described in the black list as a transmission source, the processing circuitry
gives a command to the border router so as to discard the first type of packet, and
upon reception of any of a third type of packet that is any of a reply packet of the predetermined service, addressed to the target of the attack, and a fragmented packet addressed to the target of the attack, gives a command to a border router in the list preparation state so as to discard the third type of packet.

4. The control device according to claim 1, wherein the processing circuitry is further configured to
monitor an addition state of an IP address to a black list of each border router in a list preparation state and,
when addition of an IP address to the black list of the border router is not conducted for a predetermined period, determine that a state of the border router shifts from the list preparation state to a list blocking state, wherein
with regard to a border router that is determined to shift to the list blocking state, upon reception of the first type of packet, addressed to the target of the attack, with an IP address described in the black list as a transmission source, the processing circuitry
gives a command to the border router so as to discard the first type of packet, and
upon reception of any of a third type of packet that is any of a reply packet of the predetermined service, addressed to the target of the attack, and a fragmented packet addressed to the target of the attack, gives a command to a border router in the list preparation state so as to discard the third type of packet.

5. The control device according to claim 1, wherein the processing circuitry is further configured to, when an amount of per-hour traffic of a target-addressed black-list excluded reply packet, which is a reply packet with an IP address that is not described in the black list as a transmission source, among reply packets of the predetermined service, addressed to the target of the attack and received by a border router that is in the list preparation state, becomes equal to or less than a predetermined value, determine that the border router shifts from a list preparation state to a list blocking state, wherein with regard to a border router that is determined to shift to the list blocking state, upon reception of a third packet, addressed to the target of the attack, with an IP address described in the black list as a transmission source, the processing circuitry gives a command to the border router so as to discard the first type of packet, and upon reception of a third type of packet that is any of a reply packet of the predetermined service, addressed to the target of the attack, and a fragmented packet addressed to the target of the attack, gives a command to a border router in the list preparation state so as to discard the third type of packet.

6. The control device according to claim 2, wherein the processing circuitry is further configured to observe an amount of traffic of a reply packet of the predetermined service to an IP address of the target of the attack in each of the border routers, wherein upon reception of any of a fourth type of packet that is any of a reply packet of the predetermined service, addressed to the target of the attack, received by a border router in an initial state, and a fragmented packet addressed to the target of the attack, received by a border router in an initial state, the processing circuitry gives a command to the border router in the initial state so as to discard the fourth type of packet, the processing circuitry does not acquire a reply packet of the predetermined service, addressed to the target of the attack, from a border router in the initial state among the border routers, and based on an observed amount of traffic of a reply packet of the predetermined service to an IP address of the target of the attack in each of the border routers, the processing circuitry estimates a total number of reply packets from the respective border routers, sampled by the processing circuitry, and determines a group of border routers that are to shift from the initial state to the list preparation state to the extent that the estimated total amount of reply packets does not exceed a predetermined value.

7. The control device according to claim 6, wherein the processing circuitry uses Equation (1) described below to estimate a total number of reply packets from the respective border routers, wherein the total number of reply packets from the respective border $$\text{routers} = T\_1 * r\_1 + T\_2 * r\_2 \quad \text{Equation (1)},$$

wherein, $T\_1$ is a total amount of per-hour traffic of a target-addressed black-list excluded reply packet, which is a reply packet with an IP address that is not described in the black list as a transmission source, among reply packets of the predetermined service, addressed to the target of the attack and received by each of the border routers that are in the list preparation state, $T\_2$ is a total amount of per-hour traffic of a target-addressed black-list excluded reply packet, received by each border router that is in the list blocking state, $r\_1$ is a percentage of reply packets, acquired by the processing circuitry, among reply packets of the predetermined service, addressed to the target of the attack and received by each border router that is in the list preparation state, and $r\_2$ is a percentage of reply packets, acquired by the processing circuitry, among reply packets of the predetermined service, addressed to the target of the attack and received by each border router that is in the list blocking state.

8. A border router that connects networks and that changes a setting in accordance with a command from a control device, a notification of an occurrence of an attack due to concentration of reply packets of a predetermined service and information on a target of the attack being received from the control device, comprising:

processing circuitry configured to, upon reception of a reply packet of the predetermined service, addressed to the target of the attack, add a transmission-source IP address of the reply packet to a black list;

upon reception of a first type of packet, which is any of a reply packet of the predetermined service, addressed to the target of the attack, and a fragmented packet, addressed to the target of the attack, with an IP address described in the black list as a transmission source, discard the first type of packet; and after the attack is detected by the control device, when information on a request packet of the predetermined service, transmitted from the target of the attack, observed by the control device, is received from the control device, the processing circuitry sets an exception rule to exclude a second type of packet, which is any of a reply packet of the predetermined service and a fragmented packet, whose transmission-source IP address is a destination IP address of the request packet, from the discarding.

9. A control method, implemented by a control device, for giving a command to each of border routers, connecting networks, so as to control transfer of packets, comprising:

receiving a concentration of reply packets of a predetermined service;

detecting an attack in response to the concentration of reply packets of the predetermined service, and performing a step of acquiring at least some of reply packets of a predetermined service, addressed to a target of the attack and received by the border router;

a step of adding a transmission-source IP address of the acquired reply packet to a black list of the border router;

a step of, receiving a first type of packet, which is any of a reply packet of the predetermined service, addressed to the target of the attack, and a fragmented packet, addressed to the target of the attack, with an IP address described in the black list as a transmission source, and giving a command to the border router so as to discard the first type of packet; and after the attack is detected, upon reception of a request packet of the predetermined service from the IP address of the target of the attack, giving a command to each of the border routers so as to set an exception rule to exclude a second type of packet, which is any of a reply packet of the predetermined service and a fragmented packet, whose transmission-source IP address is a destination IP address of the received request packet, from the discarding.

10. A control method for a border router, connecting networks, to control transfer of packets, comprising:

a step of receiving, from a control device, a notification of an occurrence of an attack due to concentration of reply packets of a predetermined service and information on a target of the attack and, subsequently, upon reception of a reply packet of the predetermined service, addressed to the target of the attack, adding a transmission-source IP address of the reply packet to a black list;

a step of receiving a first type of packet, which is any of a reply packet of the predetermined service, addressed to the target of the attack, and a fragmented packet, addressed to the target of the attack, with an IP address described in the black list as a transmission source, and discarding the first type of packet; and after the attack is detected by the control device, when information on a request packet of the predetermined service, transmitted from the target of the attack, observed by the control device, is received from the control device, setting an exception rule to exclude a second type of packet, which is any of a reply packet of the predetermined service and a fragmented packet, whose transmission-source IP address is a destination IP address of the request packet, from the discarding.

11. A non-transitory computer readable storage medium having stored therein a control program for a computer to execute a process comprising:

receiving a concentration of reply packets of a predetermined service;

detecting an attack in response to the concentration of reply packets of the predetermined service, and performing a step of acquiring at least some of reply packets of the predetermined service, addressed to a target of the attack and received by a border router;

a step of adding a transmission-source IP address of the acquired reply packets to a black list of the border router;

a step of receiving a first type of packet, which is any of a reply packet of the predetermined service, addressed to the target of the attack, and a fragmented packet, addressed to the target of the attack, with an IP address described in the black list as a transmission source, and giving a command to the border router so as to discard the first type of packet; and after the attack is detected, upon reception of a request packet of the predetermined service from the IP address of the target of the attack, giving a command to each of the border routers so as to set an exception rule to exclude a second type of packet, which is any of a reply packet of the predetermined service and a fragmented packet, whose transmission-source IP address is a destination IP address of the received request packet, from the discarding.

* * * * *